P. J. BESOSA.
SHUTTER CONTROLLING MECHANISM FOR FILM CAMERAS.
APPLICATION FILED JULY 31, 1915. RENEWED NOV. 28, 1917.
1,308,617.
Patented July 1, 1919.
2 SHEETS—SHEET 2.
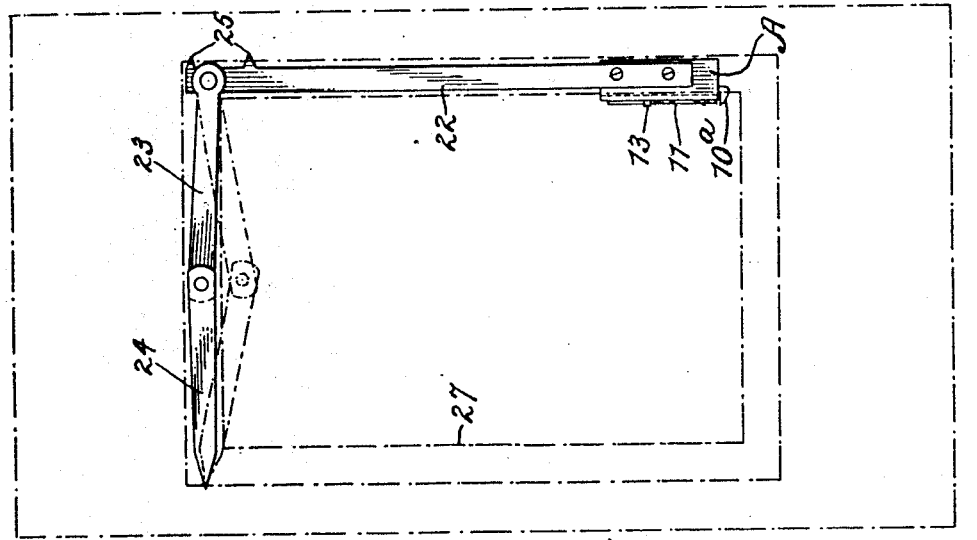
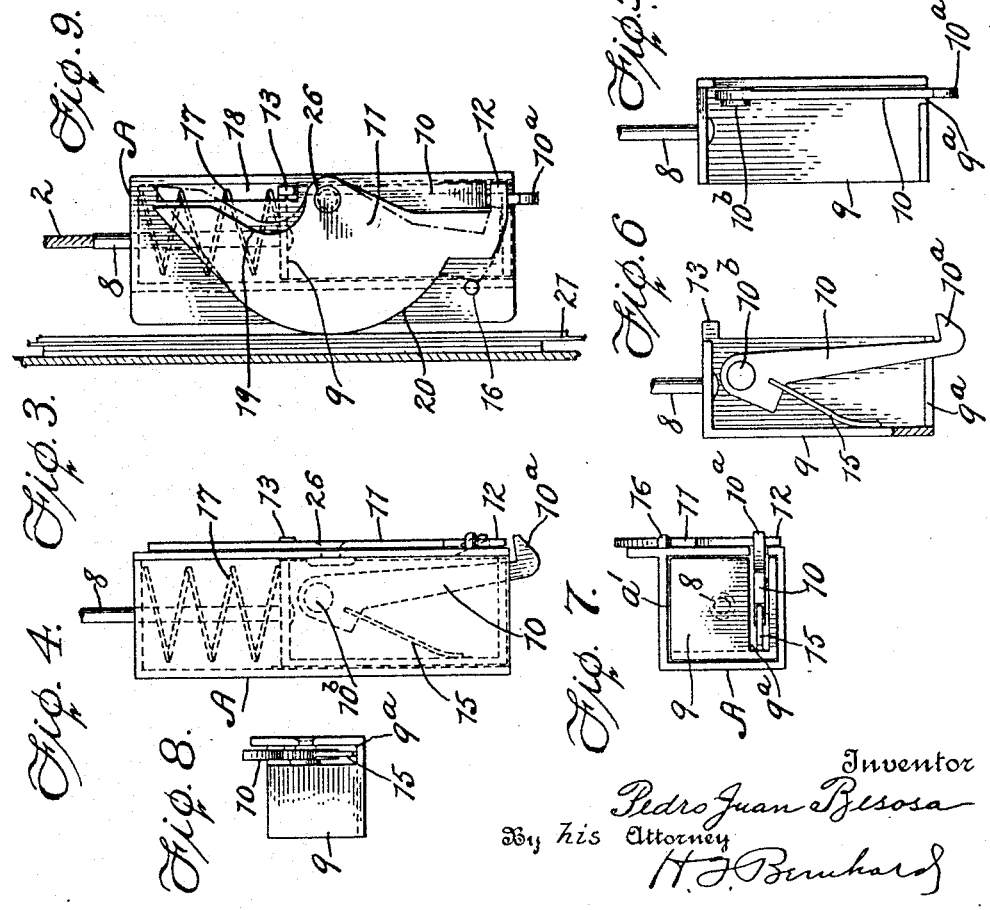

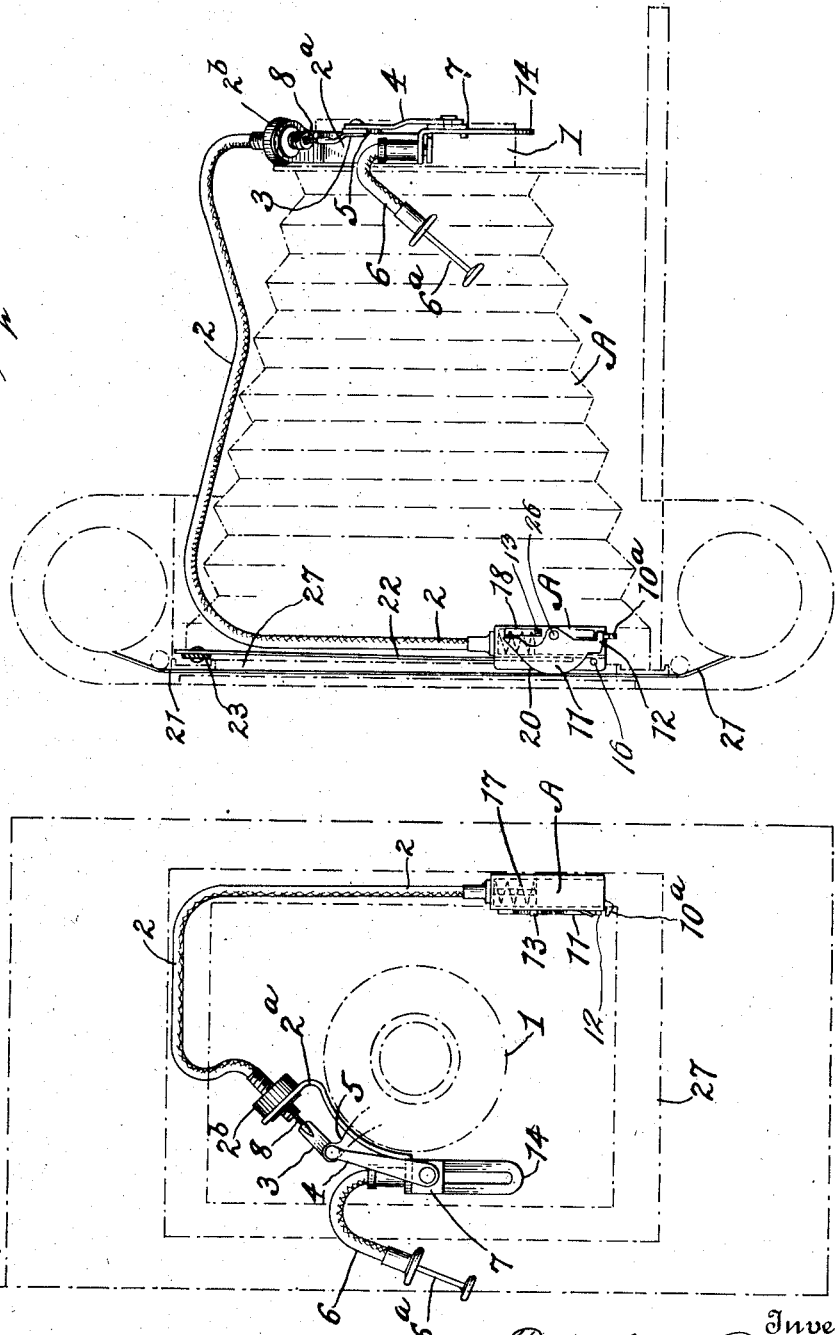

UNITED STATES PATENT OFFICE.

PEDRO JUAN BESOSA, OF NEW YORK, N. Y.

SHUTTER-CONTROLLING MECHANISM FOR FILM-CAMERAS.

1,308,617.  Specification of Letters Patent.  Patented July 1, 1919.

Application filed July 31, 1915, Serial No. 42,914. Renewed November 28, 1917. Serial No. 204,455.

*To all whom it may concern:*

Be it known that I, PEDRO JUAN BESOSA, a citizen of the United States, residing at the city of New York, borough of Manhattan, county and State of New York, have invented a certain new and useful Shutter-Controlling Mechanism for Film-Cameras, of which the following is a specification.

This invention is a means for use in connection with cameras, particularly film cameras, whereby the shutter is automatically locked after the sensitized surface shall have been exposed, provision being made for the release of the shutter at the time a fresh sensitized surface is placed in line with the lens, as a result of which operations a double exposure is precluded.

The objects of the invention are, first, to preclude the operation of the camera shutter after one photographic exposure shall have been made upon a sensitized surface, thus preventing the operation of said camera shutter until the exposed photographic surface shall have been replaced by a fresh photographic surface, and, second, to enable the device to be attached easily and quickly to cameras now in use, although said device may be embodied in cameras at the time of making the same.

In a preferred embodiment of the invention, means are provided for coöperation with the camera shutter and with a sensitized roll film whereby the shutter is locked against operation after it shall have been once operated to make a photographic exposure upon a definite part of the sensitized film, said shutter remaining in such locked condition until released by means adapted to be actuated by movement imparted to the film by the usual film operating devices of the camera, as a result of which shutter locking and releasing operations the camera must be manipulated in a way to avoid an undesirable second exposure of a previously exposed section or length of the film.

The invention, in a preferred form, embodies a shutter locking means positioned within the bellows of a camera, at the rear part thereof, said shutter locking means being connected by suitable means with the shutter, combined with film operated means for releasing said locking means.

The invention embodies, also, an attaching device operatively connected with a part of the shutter-locking means, said attaching device being operable by hand for readily mounting the shutter-locking means within a frame-member of the camera bellows.

Other features and advantages of the invention will appear from the following detailed description taken in connection with the drawings, wherein—

Figure 1 is a front view of my invention applied to an ordinary film camera, the latter being shown in dotted lines.

Fig. 2 is a side elevation of the invention, the camera being shown in dotted lines and the bellows being extended.

Fig. 3 is a side elevation of the carrier, the locking device, and certain parts associated therewith, the parts being turned one-quarter way around from the position shown in Figs. 1 and 2.

Fig. 4 is a view of the parts shown in Fig. 3, looking from the bottom thereof.

Fig. 5 is a view in elevation of the sliding member and the locking member removed from the carrier.

Fig. 6 is a view of the parts shown in Fig. 5, looking from the bottom.

Fig. 7 is an elevation of the parts shown in Figs. 3 and 4, looking toward the right hand end of said figures.

Fig. 8 is an end view of the parts shown in Figs. 5 and 6.

Fig. 9 is an elevation illustrating one means for fixedly mounting the carrier within a camera, the latter being indicated in dotted lines.

A designates a part, termed herein a carrier, adapted to be positioned within a film camera, shown in dotted lines in Figs. 1 and 2. Said part is in the form of a substantially oblong or rectangular casing, one wall of which is provided with a longitudinal slot 18, and one end of which is open at $a'$, as shown in Fig. 7. The carrier A supports the locking mechanism and the releasing mechanism, said locking mechanism operating to preclude movement of the shutter which coöperates with the lens tube, the latter being indicated by the numeral 1 in Figs. 1 and 2, whereas the releasing mechanism is positioned in the path of the film 21 as the latter passes from the supply spool to the take-up spool, as usual in ordinary film cameras, said releasing mechanism being adapted to contact with the film as graphically illustrated in Fig. 2.

The carrier A occupies a vertical position within the bellows A' of the camera, substantially at the rear thereof, said carrier being retained in a fixed position by any suitable means. One form of retaining means for the carrier is illustrated in Figs. 2 and 9, by reference to which it will be seen that the carrier A is fixedly attached to a supporting bar 22, the upper part of which bar is provided with spurs or teeth 25. Pivoted to the upper part of the bar 22 is a link 23 having pivotal connection with a cooperating link 24, one end of said link 24 being pointed so as to serve as a spur. In applying the device A to a camera the bar 22 and the carrier A are positioned within the wooden frame shown in dotted lines at 27 (Fig. 9) at the rear of the camera, whereas the links 23, 24 occupy the dotted line position of Fig. 9. As shown, the spurs 25 of the bar 22 and the pointed end of the link 24 are in contact with the opposite side portions of the wooden camera frame 27, and by pressing upwardly on the links 23, 24 at their pivotal connection, the links are straightened so as to assume the full line position of Fig. 9, whereby the spurs 25 of the bar 22 and the pointed end of the link 24 are embedded within the wooden frame, the effect of which is to fixedly support the bar 22 and the carrier A within the camera. It is manifest that the carrier and its supporting devices may easily and quickly be attached to an ordinary film camera within the bellows A' and at the rear thereof, thus enabling the device of my invention to be applied to cameras already made and in the possession of the users, although it is apparent that the carrier A and its supporting means may be embodied in new cameras during the process of manufacturing the same.

9 designates a member slidable within the chambered carrier A. Said slidable member 9, shown in detail in Figs. 5, 6 and 7, is in the form of a three-sided piece adapted for engagement with the walls of the chambered carrier, but the lineal dimensions of the slidable member 9 are considerably less than the corresponding dimensions of the carrier A, so that the part 9 is free to move longitudinally within said carrier. The slidable member 9 is normally pressed toward the open end a' of the carrier by a spring 17, the latter being shown as a coiled spring which, with the sliding member, is incased within said carrier A. It is apparent that the spring 17 impels the slidable member in one direction, but said member is moved positively in the opposite direction by a flexible wire or cable 8, the latter being attached in any preferred way to the sliding member 9 for the purpose of pulling said member against the tension of the spring.

Referring now more particularly to Figs. 3 to 8, inclusive, the slidable member 9 is provided in one end with a slot 9$^a$ (see Fig. 8), and within this slidable member is positioned a locking member 10, the latter being in the form of a plate which is provided at its free end with a hook or beak 10$^a$. Said locking member or latch 10 is pivoted by a pin 10$^b$ to the sliding member, and to this pivoted latch is attached one end portion of a leaf spring 15, the other end portion of said spring being seated against the sliding member so that the spring and the pivoted latch will travel with the sliding member, and said spring acts constantly on the pivoted latch to move the hook-shaped end thereof in the path of a releasing plate 11. Said plate 11 is applied laterally against one side of the carrier A, and as shown in Fig. 3, this releasing member is pivoted to the carrier by a pin 26. The releasing member is provided with a notched or cut-away portion 19, with a finger 12, and with a curved contacting edge 20, all as clearly shown in Fig. 3. A stop pin fixed to carrier A arrests the pivotal movement of releasing plate 11 when the latter moves in one direction. The sliding member 9 is provided at one end with a stud 13 positioned for movement in the slot 18 of the carrier, said stud 13 being opposite to the cut-away portion 19 of the releasing plate. The finger 12 is provided on the releasing plate at a point to extend across the path of the beak 10$^a$ of the pivoted latch.

The flexible wire or cable 8 extends loosely through a tubular flexible cord 2, said wire 8 and tubular cord 2 extending from the carrier A upwardly through the rear part of bellows A', thence passing through an opening in the bellows, and thence passing loosely outside of the bellows, all as shown in Fig. 2. The cord 2 and wire 8 are flexible so as to fold and unfold with the bellows, said cord 2 and wire 8 extending from the carrier A at the rear of the bellows to the front plate or head of said camera, see Figs. 1 and 2. The forward part of the tubular cord 2 is attached to a bracket plate 2$^a$ fixed on the tube 1 which carries the shutter, the connection between the tubular cord 2 and the bracket plate 2$^a$ being effected by a thumb nut 2$^b$. The forward part of the flexible wire or cable 8 extends through the nut and the bracket plate so as to be attached to a link 3. Said link 3 together with another link 4 are pivoted by a common pin to an arm 5 of the shutter mechanism. The link 4 is pivoted at its other end to a slide 7, the latter being loosely held on a fixed slotted plate 14 by means of a pin or other device, whereby the slide 7 is adapted for movement relatively to the plate 14 for the purpose of actuating the links 3, 4, the movement of the link 4 serving to operate the arm 5 and the shutter, whereas the movement of the link 3 pulls on the flexible wire or cable 8 so as to impart movement to the slidable member 9.

A short length of tubular cord 6 is attached by suitable means to an angular end portion of the fixed slotted plate 14, see Figs. 1 and 2, and through said tubular cord extends a flexible wire or cable 6ª, the latter being attached to the slide 7 so that when an operator presses on the cord or cable 6ª the slide 7 will be moved forwardly upon the slotted plate 14 for the purpose of imparting movement to the links 3 and 4, as hereinbefore described.

It will be understood that when the releasing plate and its finger 12 are in the position shown in Fig. 3, the finger is in the path of the hook 10ª so as to lock the latch 10 and the carrier 9 against movement by the pull of the flexible wire or cable 8, the effect of which is to lock the shutter arm 5 from movement, whereby the shutter mechanism is precluded from operation by pressure upon the wire or cord 6ª. The releasing plate 11 is supported by the carrier A in a position for its curved edge 20 to contact with the film 21, and when the film is moved by the manipulation of devices usual in a camera to feed the film a predetermined distance, the contact of the edge 20 with the moving film will act to turn the plate 11 on the pin 26, whereby the finger 12 is withdrawn from the path of the hook 10ª on the latch 10, so that the movement of the plate 11 will free the latch 10 and thus permit the cable 8 to operate the shutter when pressure is applied to the wire or cable 6ª. It is to be noted in this connection, however, that after a part of the film has been exposed and prior to the movement of the film so as to present a fresh surface in the focal plane of the lens the latch 10 will engage with the finger 12 of the releasing plate so as to lock the shutter against a subsequent movement should pressure be applied to the cord 6ª for the operation of the shutter, thus preventing the camera from being operated or manipulated through inadvertence or carelessness in such a way that a second exposure may be made upon a previously exposed part of the film; but when the operator feeds the film the required distance the movement of the film in contact with the edge 20 will turn the releasing plate 11 so as to withdraw the finger 12 from the path of the hook and latch, whereby the shutter can be thereafter operated by applying pressure to the wire 6ª so as to effect the subsequent exposure of the film in the usual manner.

The releasing plate when turned to a position to withdraw its finger 12 from the path of the hook on the latch is returned to a normal position by the engagement of the stud 13 on the slidable member with the edge of the cut-away portion 19 of said releasing plate, it being apparent that the movement of the sliding member will impart movement to the stud 13 so that the plate 11 will be returned to its normal position. It is to be understood that my invention is to be used in connection with shutters having provision for the instantaneous exposure of a film by a single movement of the shutter, or with a time exposure, or with a bulb-controlled exposure, and in this connection the cut-away portion 19 of the releasing member 11 allows the stud 13 to co-act with said releasing member under all conditions of exposure.

Having thus fully described the invention, what I claim as new, and desire to secure by Letters Patent is:

1. The combination with a shutter-operating member, of a supporting member positioned adjacent the path of a film, a shutter-locking member carried by the supporting member, means for operatively connecting the shutter-locking member with said shutter-operating member, and means coöperating with the shutter-locking member, said last mentioned means being positioned for contact with a film and operated by the movement thereof to release the shutter-locking member from restraint.

2. The combination with a shutter-operating member, of a shutter-locking member operatively connected with said shutter operating member so as to be responsive to the movements thereof, and a releasing member coöperating directly with the shutter locking member for restraining the latter from responding to the movements of the shutter operating member, said releasing member being positioned for contact with a film and adapted to be shifted by the movement of said film into a position to free the shutter locking member from restraint.

3. The combination with a film camera and a shutter therefor, of shutter locking means, and releasing means coöperating with said locking means, said shutter locking means and said releasing means being mounted on a carrier having means for readily attaching the same to said camera.

4. In a device of the class described, the combination with a carrier, of attaching means therefor, a locking dog movable relatively to said carrier, shutter controlling means coöperating with said dog, and a film-operated releasing member positioned for contact with said locking dog.

5. In a device of the class described, the combination with a carrier, of attaching means therefor, a member slidably connected with said carrier, a locking dog pivoted to the slidable member, shutter controlling means coöperating with said slidable member, and a film-operated releasing member pivoted to the carrier, said releasing member having means for returning the locking dog to a free position.

6. In a device of the class described, the combination with a carrier, of attaching means therefor, a member slidable within the carrier, a locking dog pivoted to said slidable member, a spring for moving said dog in one direction, a releasing plate pivoted to said carrier and provided with a finger positioned in the path of said locking dog, said releasing plate having a curved edge adapted for engagement with a film, and means for operating said slidable member.

7. In a device of the class described, the combination of a carrier, a member slidable therein, a spring for moving said member in one direction, a cable for moving the member in an opposite direction, a locking dog pivoted to the slidable member, and a releasing member pivoted to the carrier, said releasing member having means for engagement with the locking dog and said releasing member having a curved edge positioned for contact with a film.

8. In a device of the class described, the combination of a carrier, a member slidable therein, a spring for moving said member in one direction, a cable for moving the member in an opposite direction, a locking dog pivoted to the slidable member, and a film operated releasing member coöperating with the locking dog, said releasing member being provided with a cut away portion and said slidable member having a stud positioned for contact with said releasing member.

9. In a device of the class described, the combination with a carrier of a supporting member attached thereto, means coöperating with said supporting member for fixedly attaching the same to a camera, shutter locking means mounted upon said carrier, and film operated releasing means mounted upon the carrier and coöperating with said shutter locking means.

10. In a camera, the combination with a shutter operating member, of a slide linked to said member, manually operable means for imparting movement to the slide, a carrier, a slidable member thereon, a cable attached to the slidable member and linked to the shutter operating member, a locking dog movable with the slidable member, and a film operated releasing member coöperating with said locking dog.

11. The combination with a shutter-operating member, of manually-operable means coöperating directly therewith, a shutter-locking member connected operatively with said shutter-operating member and responsive to the movements thereof when operated by said manually-operable means, and a releasing member coöperating with said shutter-locking member for restraining the same from movement, said releasing member being positioned for contact with a photographic surface so as to be actuated by the movement thereof.

12. The combination with a shutter-operating member, of a shutter-locking member adapted to respond to the movements of said shutter operating member, and a releasing member coöperating directly with the shutter locking member for restraining the same from movement, said releasing member being positioned for contact with a photographic surface and actuated by the movement involved in replacing an exposed surface by an unexposed sensitized surface.

In testimony whereof I have hereunto signed my name.

PEDRO JUAN BESOSA.

Witnesses:
C. BUSTAMANTEFF,
M. C. RODRIGUEZ.